US007255355B2

(12) United States Patent
Chisholm et al.

(10) Patent No.: US 7,255,355 B2
(45) Date of Patent: Aug. 14, 2007

(54) PORTABLE COLLAPSIBLE STAND

(75) Inventors: John Chisholm, Lawndale, CA (US); Shawn Tsung, Monterey Park, CA (US); Paulo Carrolo, Merritt Island, FL (US)

(73) Assignee: MK Diamond Products, Inc., Torrance, CA (US)

( * ) Notice: Subject to any disclaimer, the term of this patent is extended or adjusted under 35 U.S.C. 154(b) by 71 days.

(21) Appl. No.: 11/028,725

(22) Filed: Jan. 3, 2005

(65) Prior Publication Data

US 2006/0145045 A1 Jul. 6, 2006

(51) Int. Cl.
*B60N 2/28* (2006.01)

(52) U.S. Cl. ....................... 280/30; 280/29; 280/47.16; 280/47.17; 280/47.18; 280/47.19; 280/47.2; 280/47.22; 280/47.24; 280/47.25; 280/47.27; 280/47.28; 280/47.33; 280/47.34; 280/638; 280/639; 280/641; 280/651; 280/652; 248/439; 248/588; 248/631; 248/647; 248/676

(58) Field of Classification Search ................ 248/439, 248/588, 631, 647, 676; 280/29, 30, 47.16, 280/47.17, 47.18, 47.19, 47.2, 47.22, 47.24, 280/47.25, 47.27, 47.28, 47.33, 47.34, 638, 280/639, 641, 651, 652

See application file for complete search history.

(56) References Cited

U.S. PATENT DOCUMENTS

| | | | | | |
|---|---|---|---|---|---|
| 3,669,031 | A | * | 6/1972 | Cole | 108/102 |
| 3,752,527 | A | * | 8/1973 | Ferneau et al. | 296/20 |
| 4,192,541 | A | * | 3/1980 | Ferneau | 296/20 |
| 4,284,286 | A | * | 8/1981 | Lewallen | 280/30 |
| D307,498 | S | * | 4/1990 | Kawana | D34/31 |
| 4,969,496 | A | * | 11/1990 | Romans | 144/286.1 |
| 5,087,013 | A | * | 2/1992 | Gress et al. | 248/676 |
| 5,505,471 | A | * | 4/1996 | Cheng | 280/30 |
| 5,560,582 | A | * | 10/1996 | Beelen | 248/588 |
| 5,676,124 | A | * | 10/1997 | Lee | 125/13.01 |
| 5,941,543 | A | * | 8/1999 | Kazmark, Jr. | 280/47.29 |
| 6,345,829 | B1 | * | 2/2002 | Mueller | 280/47.18 |
| 6,435,460 | B1 | * | 8/2002 | Van Cleave et al. | 248/164 |
| 6,471,220 | B1 | * | 10/2002 | Babb | 280/30 |

(Continued)

FOREIGN PATENT DOCUMENTS

AU 2003256793 A1 7/2004

(Continued)

*Primary Examiner*—Cari D. Friedman
*Assistant Examiner*—Todd M. Epps
(74) *Attorney, Agent, or Firm*—McAndrews, Held & Malloy, Ltd.

(57) ABSTRACT

A portable collapsible stand includes first, second, and third support frames, a work surface frame, and a telescoping strut pivotably connected to the first and work surface frames. The second frame projects perpendicularly from a lower portion of the first frame. A first end of the third frame is rotatably connected to an upper portion of the first frame such that the third frame pivots from a first parallel position to a second perpendicular position with respect to the first frame. An upper portion of the work surface frame is rotatably connected to the upper portion of the first frame. In operation, the stand can assume a collapsed position in which the first, third and work surface frames are generally parallel, and an operating position in which the third frame and first frame are perpendicular and the work surface frame and surface supporting the stand are parallel.

11 Claims, 5 Drawing Sheets

U.S. PATENT DOCUMENTS

| | | | | |
|---|---|---|---|---|
| 6,471,236 | B1 * | 10/2002 | Eskridge | 280/648 |
| 6,530,583 | B1 * | 3/2003 | Mueller | 280/47.18 |
| 6,578,856 | B2 * | 6/2003 | Kahle | 280/30 |
| 6,837,501 | B1 * | 1/2005 | Hedrick | 280/30 |
| 6,886,836 | B1 * | 5/2005 | Wise | 280/30 |
| 7,077,421 | B2 * | 7/2006 | Wu | 280/645 |
| 7,086,434 | B2 * | 8/2006 | Lee | 144/286.1 |
| D529,252 | S * | 9/2006 | Wu | D34/24 |

FOREIGN PATENT DOCUMENTS

| | | | |
|---|---|---|---|
| EP | 0670283 | A1 | 9/1995 |

* cited by examiner

PORTABLE COLLAPSIBLE STAND

FIELD OF THE INVENTION

The present invention relates to a collapsible stand. More particularly, the present invention relates to a collapsible stand that is portable and provides support for an object, such as a tool. Although the present apparatus is useful for supporting and moving tools, such as a saw, the apparatus could be employed for many types of equipment or needs where portability is desired along with a stable work surface.

BACKGROUND OF THE INVENTION

Portable collapsible stands have many uses such as providing portable work surfaces, supporting tools, minimizing storage space requirements, and increasing the mobility of objects that are difficult to move. Such stands are particularly useful in the construction industry where portability of tools is desirable, often leading to increases in work efficiency and ultimate cost savings. Generally, the heavier a tool is, the more awkward it is to transport not only to and from, but also, around project sites.

Where a tool is attached to a collapsible stand, the weight of the combined unit is generally centered about the tool, which is often positioned on the top of the stand. Because of the high center of gravity, such positioning increases awkwardness and the tendency to tip over while transporting and handling the tool. Moving such a tool leads not only to increased safety concerns for the tool operator, but also to a likely decrease in work quality. A tool-stand combination with a high center of gravity is not only less stable, but also more difficult to set up and break down.

Existing conventional portable collapsible stands suffer from the foregoing shortcomings in that they are generally not easily transportable and do not provide a stable surface for the tool they are to support. Existing devices are also generally not easily set up for operation or broken down for transport or storage.

SUMMARY OF THE INVENTION

One or more shortcomings of existing devices are overcome by a portable collapsible stand that, in one embodiment, comprises:

(a) a first support frame capable of supporting a first generally planar surface, the first frame having an upper portion, a middle portion and a lower portion, (b) a second support frame capable of supporting a second generally planar surface, the second frame connected to the lower portion of the first frame, the second frame projecting generally perpendicularly from the first frame;

(c) a third support frame capable of supporting a third generally planar surface, the third frame having a first end and a second end, the third frame first end rotatably connected to the first frame upper portion whereby the third frame is pivotable from a first position generally parallel to the first frame to a second position generally perpendicular to the first frame;

(d) a work surface frame capable of supporting a partially planar surface, the work surface frame having an upper portion and a lower portion, the work surface frame upper portion rotatably connected to the first frame upper portion; and (e) at least one telescoping strut, the telescoping strut pivotably connected to the first frame and the work surface frame.

In operation, the stand is capable of assuming a collapsed position in which the first frame, the third frame and the work surface frame are generally parallel, and an operating position in which the third frame is generally perpendicular to the first frame and the work surface frame is generally parallel to a surface supporting the stand.

In a preferred embodiment of the foregoing portable collapsible stand, the first frame and the second frame are integrally connected. The stand preferably further comprises at least one wheel rotatably connected to the first frame. The stand also preferably further comprises at least one primary wheel rotatably connected to the first frame lower portion and at least one secondary wheel rotatably connected to the first frame upper portion, such that the stand is movable across the surface supporting the stand on the primary and secondary wheels when the stand is in the collapsed position and the first, third and work surface frames are generally parallel to the surface supporting the stand. The telescoping strut is preferably capable of at least partially urging the work surface frame between the collapsed position and the operating position. The work surface frame preferably supports a tool such that the tool weight is substantially directed toward the work surface frame lower portion. The telescoping strut preferably comprises a fluid cylinder (that is, a liquid- or gas-filled cylinder). A tool attachment is preferably integrated with the work surface frame.

In another embodiment, a portable collapsible stand comprises:

(a) a first support frame, wherein the first frame has an upper portion, a middle portion and a lower portion, the first frame comprising a generally L-shaped left side member and a generally L-shaped right side member, the left side member and the right side member connected by a plurality of cross members;

(b) a second support frame, wherein the second frame has a first end and a second end, the second frame first end rotatably connected to the first frame upper portion whereby the second frame is pivotable from a first position generally parallel to adjacent the first frame to a second position generally perpendicular to adjacent the first frame;

(c) a third support frame capable of forming at least a partially planar surface, wherein the third frame has an upper portion and a lower portion, the third frame upper portion rotatably connected to the first frame upper portion; and (d) at least one telescoping strut, the telescoping strut pivotably connected to the first frame and the third frame.

In a preferred embodiment of the foregoing portable collapsible stand, the stand is capable of assuming a collapsed position in which the upper and middle portion of the first frame, the second frame, and the third frame are generally parallel, and an operating position in which the second frame is generally perpendicular to the upper and middle portions of the first frame and the third frame is generally parallel to a surface supporting the stand. The stand preferably further comprises at least one wheel rotatably connected to the first frame. The stand also preferably further comprises: at least one primary wheel rotatably connected to at least one of the first frame lower portion and the first frame middle portion, and at least one secondary wheel rotatably connected to the first frame upper portion, such that the stand is movable across the supporting surface on the primary and secondary wheels when the stand is in the collapsed position and the upper and middle portion of the first frame, the second frame, and the third frame are generally parallel to the supporting surface. The telescoping strut is preferably capable of at least partially urging the third frame between the collapsed position and the operating position. The third frame preferably supports a tool such that the tool weight is substantially directed toward the third frame lower portion.

In one embodiment, a method of supporting a tool comprises:

(a) forming a first frame with a generally L-shaped left side member, a generally L-shaped right side member, and a plurality of cross-members;

(b) forming a second frame with two side members and at least one cross member;

(c) forming a tool support frame with two side members and a plurality of cross members capable of supporting a partially planar surface;

(d) rotatably connecting an upper portion of the second frame to an upper portion of the first frame whereby the second frame is pivotable from a first position generally parallel to the first frame upper portion to a second position generally perpendicular to the first frame upper portion;

(e) rotatably connecting an upper portion of the tool support frame to the first frame upper portion whereby the tool support frame is pivotable from a third position generally parallel to the first frame upper portion to a fourth position generally parallel with a stand supporting surface;

(f) pivotably connecting a first end of at least one telescoping strut to the first frame;

(g) pivotably connecting a second end of the at least one telescoping strut to a lower portion of the tool support frame.

A preferred embodiment of the foregoing method preferably further comprises rotatably connecting at least one wheel to the first frame. The method also preferably further comprises: (h) rotatably connecting at least one primary wheel to the first frame lower portion, and (i) rotatably connecting at least one secondary wheel to the first frame upper portion, whereby the first, second, and tool support frames are movable across a supporting surface on the primary and secondary wheels when the first, second, and tool support frames are in the first and third positions and are generally parallel with the stand supporting surface.

DETAILED DESCRIPTION OF PREFERRED EMBODIMENT(S)

Figure 1:
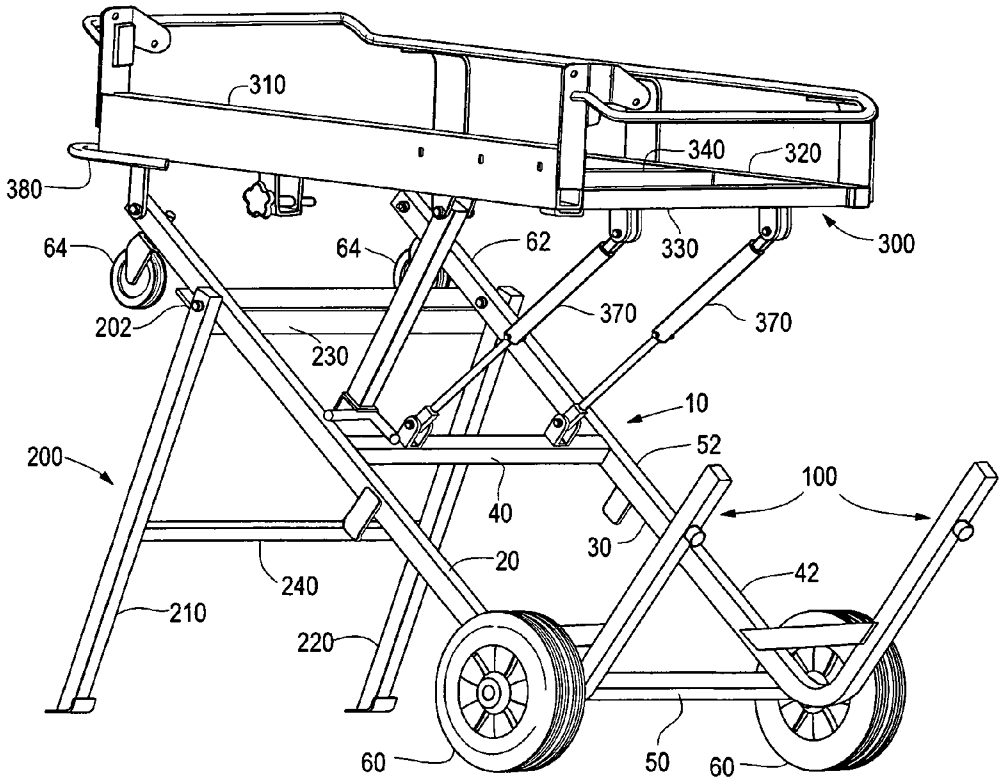
FIG. 1 is a front isometric view of one embodiment of the present portable collapsible stand in an operating position.
Figure 2:
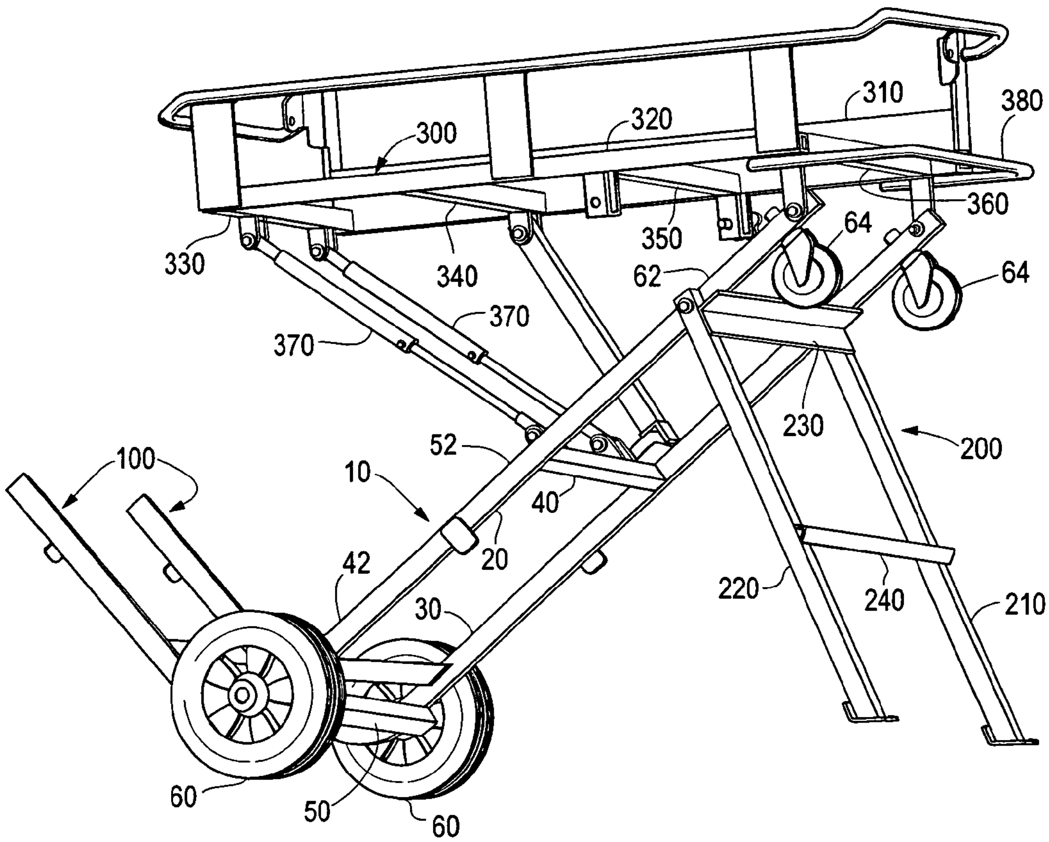
FIG. 2 is a side perspective view of the present stand in an operating position.

FIG. 1 is a front isometric view of one embodiment of the present portable collapsible stand in an operating position. FIG. 2 is a side perspective view of the present stand, also in an operating position. The stand comprises several frames connected together where each frame generally defines a planar surface. The frames can be constructed of materials that provide a generally rigid structure such as metal, wood, and/or plastic.

A first support frame 10 can include two long, straight side members 20, 30 spaced in parallel relation to each other. The side members 20, 30 can be spaced apart by a plurality of cross-members 40, 50 that are of a substantially equal length. The first support frame 10 can be the primary support frame of the stand to which the remaining frames connect.

The first support frame 10 can be divided into a lower portion 42, a middle portion 52, and an upper portion 62. A second support frame 100 can project generally perpendicular from a lower portion 42 of the first support frame 10. The second support frame 100 comprises at least one member connected to one of the side members 20, 30 of the first support frame 10 or to a cross member 50 of the first support frame 10. The connection between the first and second support frame 10, 100 can be rigid. If the connection allows the second support frame to pivot about the first support frame, a pin or friction connection can be employed to provide rigidity between the first and second support frames 10, 100. The first and second support frames 10, 100 can also be integrally connected. Integral, as used herein to describe the connection between the first and second frames 10, 100, means the first and second frames 10, 100 can comprise component parts and these parts together constitute a single unit. The single unit may, however, have parts external to it associated with each of the first and second frames 10, 100. Alternatively, an L-shaped first support frame comprising generally L-shaped left and right side members connected by a plurality of cross members can be employed in place of the first and second support frames 10, 100. With the L-shaped first support frame, a one-piece construction can be employed for the left and/or right side members.

A third support frame 200 can be connected to the upper portion 62 of the first support frame 10. The third support frame can include two side members 210, 220 and a plurality of cross members 230, 240. The third support frame 200 can be pivotable about the first support frame at a point 202, where the side members 210, 220 connect to the first support frame 10. The third support frame 200 can pivot from a position generally parallel to the first support frame 10 to a position generally perpendicular to the first support frame 10. Where the alternative L-shaped first support frame configuration is employed, the third support frame 200 can be understood to be a second support frame.

A fourth frame 300, also referred to as the work surface frame, can be connected to the first support frame 10 at the lower, middle and/or upper portions 42, 52, 62. The fourth frame 300 comprises two side members 310, 320 spaced apart by a plurality of cross members 330, 340, 350, 360 that are substantially equal in length. The fourth frame 300 can be pivotally connected to the upper portion 62 of the first support frame 10. The fourth frame 300 is also connected to at least one telescoping strut 370 that can further connect to the middle portion 52 of the first support frame 10. The telescoping strut 370 can include a fluid cylinder of the pneumatic (that is, gas) or hydraulic (that is, liquid) type. A hand bar 380 can be attached to the fourth frame 300 such that when the stand is in a collapsed position, the hand bar 380 can be employed to maneuver the stand, similar to a hand truck. Where the alternative L-shaped first support frame configuration is employed, the fourth support frame 300 can be understood to be a third support frame.

To facilitate maneuverability of the portable collapsible stand, wheels 60 can be attached at the lower portion 42 of the first support frame 10. Additional wheels 64 can also be attached at the upper portion 62 of the first frame. The wheels 60 facilitate maneuverability when the collapsible stand is in an operating position as shown in FIG. 1 or when transporting the stand in a partially upright collapsed position, similar to a hand truck. The wheels 60, 64 also facilitate maneuverability when the stand is in a collapsed and flat or prone position (see FIG. 3), such as on a flat surface or the back of a vehicle or trailer.

Figure 3:
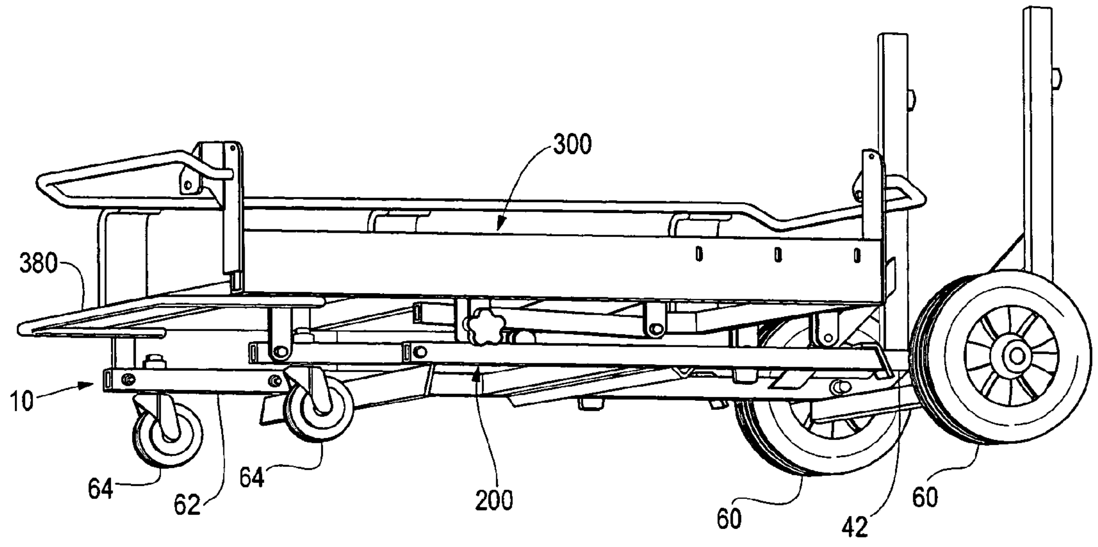
FIG. 3 is a side perspective view of an embodiment of the present stand in a collapsed position.

FIG. 3 is a side perspective view of an embodiment of the present stand in a collapsed position. In the collapsed position, the first support frame 10, third support frame 200, and work surface frame 300 are generally parallel to each other such that the collapsible stand is easily portable. The collapsible stand can be maneuvered a number of ways including on a set of wheels 60 attached at the lower portion 42 of the first support frame 10. Maneuvering of the stand on this set of wheels 60 alone generally occurs with the collapsible stand in a collapsed, upright or partially upright position, where the first, third, and work surface frames 10, 200, 300 are at an angle to a surface supporting the stand. Additional wheels 64 can be attached at the upper portion 62 of the first support frame 10 to assist with maneuvering the stand where the stand is collapsed and the first, third, and work surfaces frames 10, 200, 300 are generally parallel to the surface supporting the stand. The surface supporting the stand can include, for example, a ground surface, a floor surface, or a support surface in a transport vehicle such as a truck or trailer. The stand can be stored in a collapsed upright position where the stand is generally perpendicular to the support surface resting on the second support frame 100, or in a collapsed cart position where the collapsed stand is generally parallel to the support surface.

Figure 4:
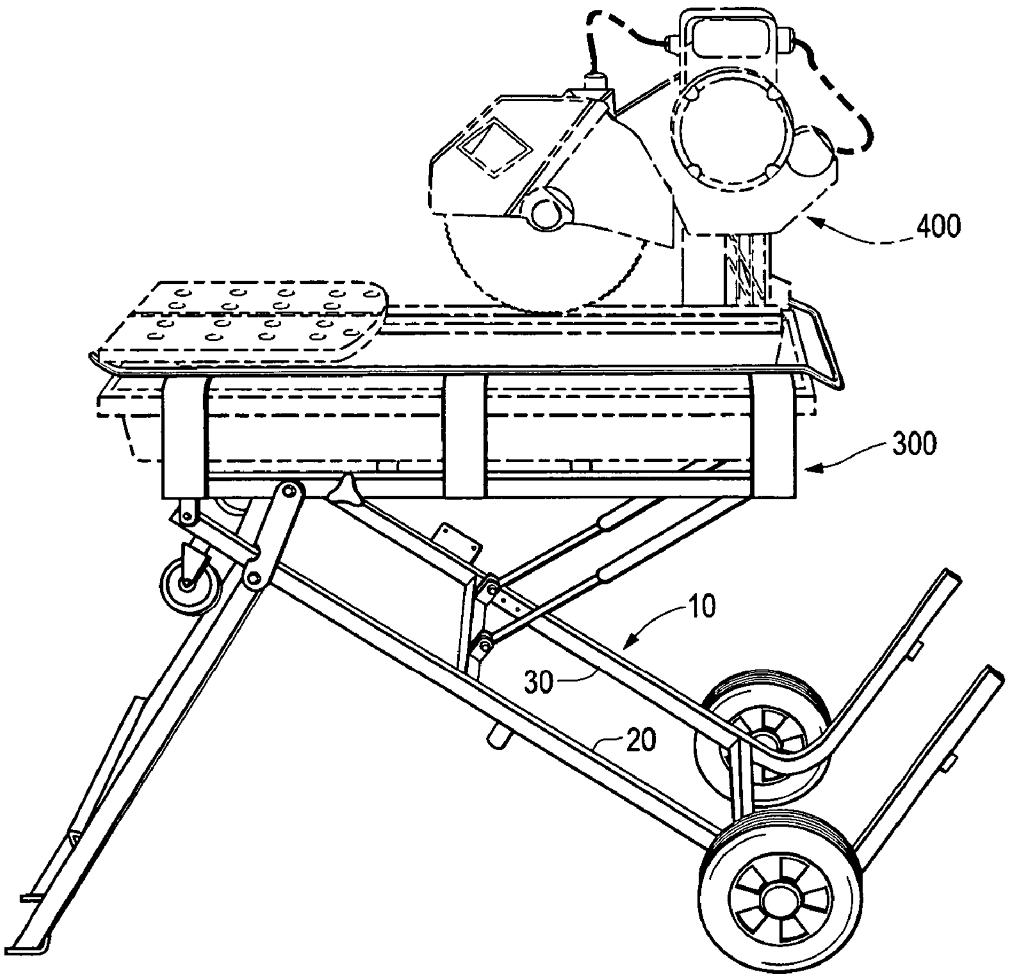
FIG. 4 is a side perspective of an embodiment of the present stand demonstrating a tool attachment.

FIG. 4 is a side perspective of an embodiment of the present stand demonstrating a tool attachment. The collapsible stand is shown in an operating position. A tool attachment 400 can be attached to the work surface frame 300 in such a way that a frame of tool attachment 400 is integrated with the work surface frame 300. Integration of the tool attachment 400 and the work surface frame 300 can occur by rigidly connecting the two elements together, for instance by at least partially forming the frame of the tool attachment 400 around an element of the work surface frame 300, such as one of side members 310, 320. Where the alternative L-shaped first support frame configuration is employed, the work surface frame 300 can be understood to be a third support frame, and the work surface frame 300 can also be referred to as a tool support frame.

Figure 5:
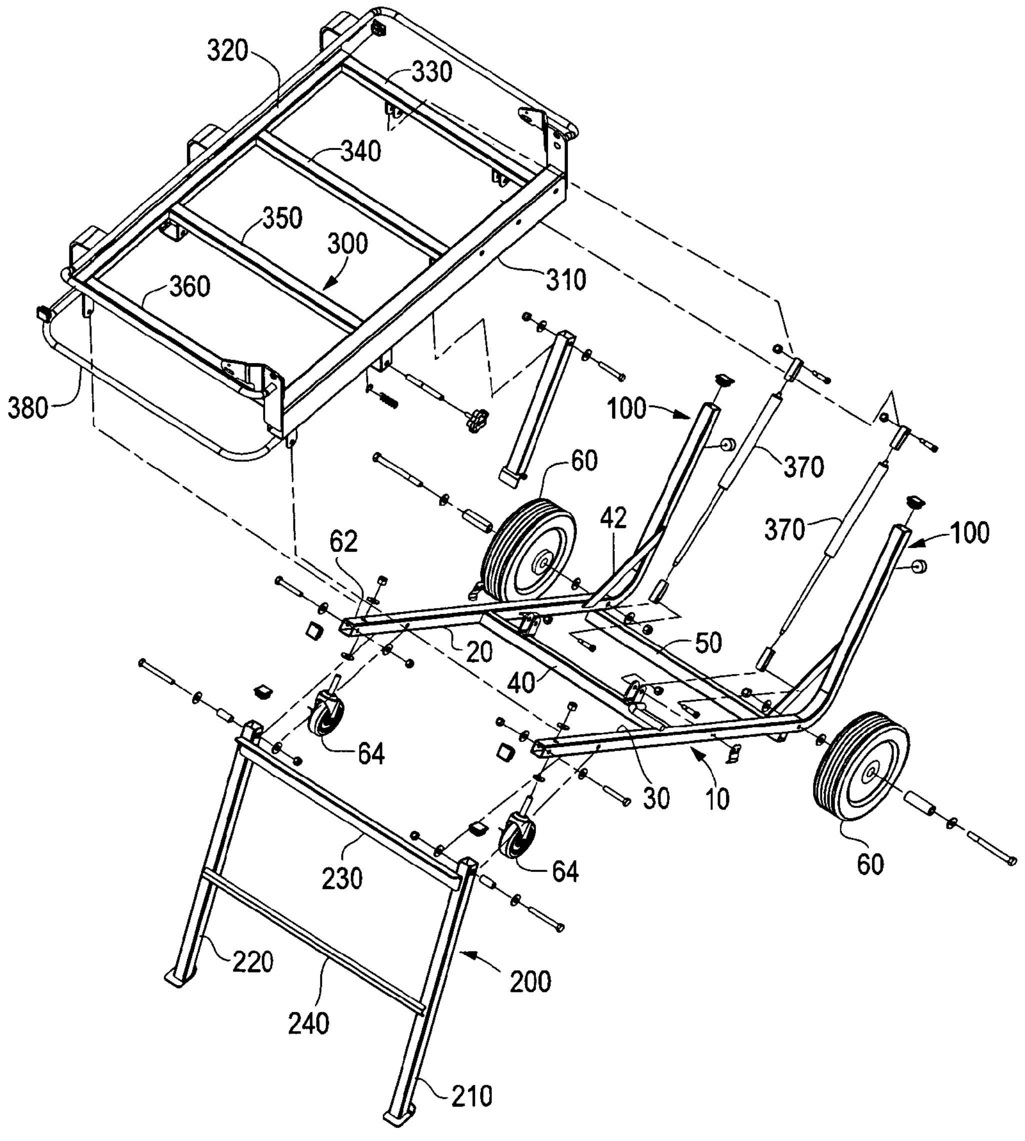
FIG. 5 is an exploded top isometric view of the present stand.

FIG. 5 is an exploded top isometric view of the present stand. A first support frame 10 can include two long, straight side members 20, 30 spaced in parallel relation to each other. The side members 20, 30 can be spaced apart by a plurality of cross-members 40, 50 that are of a substantially equal length. The first support frame 10 can be the primary support frame of the stand to which the remaining frames connect.

A second support frame 100 can project generally perpendicular from a lower portion 42 of the first support frame 10. The second support frame 100 comprises at least one member connected to one of the side members 20, 30 of the first support frame 10 or to a cross member 50 of the first support frame 10. The connection between the first and second support frame 10, 100 can be rigid. If the connection allows the second support frame to pivot, a pin or friction connection can be employed to provide rigidity between the first and second support frames 10, 100. The first and second support frames 10, 100 can also be integrally connected. Alternatively, an L-shaped first support frame comprising generally L-shaped left and right side members connected by a plurality of cross members can be employed in place of the first and second support frames 10, 100. With the L-shaped first support frame, a one-piece construction can be employed for the left and/or right side members.

A third support frame 200 can be connected to the first support frame 10. The third support frame 200 can include two side members 210, 220 and a plurality of cross members 230, 240. Where the alternative L-shaped first support frame configuration is employed, the third support frame 200 can be understood to be a second support frame or a second frame.

A fourth frame 300, also referred to as the work surface frame, can be connected to the first support frame 10. The fourth frame 300 comprises two side members 310, 320 spaced apart by a plurality of cross members 330, 340, 350, 360 that are substantially equal in length. The fourth frame 300 can be connected to at least one telescoping strut 370 that can further connect to the first support frame 10. The fourth frame 300 can include a hand bar 380 to assist with maneuvering the stand. Where the alternative L-shaped first support frame configuration is employed, the fourth support frame 300 can be understood to be a third support frame or third frame.

To facilitate maneuverability of the portable collapsible stand, wheels 60 can be attached at the lower portion 42 of the first support frame 10. Additional wheels 64 can also be attached at the upper portion 62 of the first frame.

While particular elements, embodiments and applications of the present invention have been shown and described, it will be understood, of course, that the invention is not limited thereto since modifications can be made by those skilled in the art without departing from the scope of the present disclosure, particularly in light of the foregoing teachings.

What is claimed is:

1. A portable collapsible stand comprising:

(a) a first support frame capable of supporting a first generally planar surface, said first frame having an upper portion, a middle portion and a lower portion, (b) a second support frame capable of supporting a second generally planar surface, said second frame connected to said lower portion of said first frame, said second frame projecting generally perpendicularly from said first frame;

(c) a third support frame capable of supporting a third generally planar surface, said third frame having a first end and a second end, said third frame first end rotatably connected to said first frame upper portion whereby said third frame is pivotable from a first position generally parallel to said first frame to a second position generally perpendicular to said first frame;

(d) a work surface frame capable of supporting a partially planar surface, said work surface frame rotatably connected to said first frame upper portion;

(e) at least one telescoping strut, said telescoping strut pivotably connected to said first frame and said work surface frame;

(f) at least one primary wheel rotatably connected to said first frame lower portion; and (g) at least one secondary wheel rotatably connected to said first frame upper portion;

whereby said stand is capable of assuming a collapsed position in which said first frame, said third frame and said work surface frame are generally parallel, and an operating position in which said third frame is generally perpendicular to said first frame and said work surface frame is generally parallel to a surface supporting said stand and whereby said stand is movable across said surface supporting said stand on said primary and secondary wheels when said stand is in said collapsed position and said first, third and work surface frames are generally parallel to said surface supporting said stand.

2. The stand of claim 1, wherein said first frame and said second frame are integrally connected.

3. The stand of claim 1, wherein said telescoping strut is capable of at least partially urging said work surface frame between said collapsed position and said operating position.

4. The stand of claim 1, wherein said work surface frame supports a tool such that said tool weight is substantially directed toward an end of said work surface frame that is opposite of said rotatable connection of said work surface frame to said first frame upper portion.

5. The stand of claim 1, wherein said telescoping strut comprises a fluid cylinder.

6. The stand of claim 1, wherein a tool attachment is integrated with said work surface frame.

7. A portable collapsible stand comprising:

(a) a first support frame, wherein said first frame has an upper portion, a middle portion and a lower portion, said first frame comprising a generally L-shaped left side member and a generally L-shaped right side member, said left side member and said right side member connected by a plurality of cross members;

(b) a second support frame, wherein said second frame has a first end and a second end, said second frame first end rotatably connected to said first frame upper portion whereby said second frame is pivotable from a first position generally parallel to adjacent said first frame to a second position generally perpendicular to adjacent said first frame;

(c) a third support frame capable of forming at least a partially planar surface, wherein said third frame is rotatably connected to said first frame upper portion;

(d) at least one telescoping strut, said telescoping strut pivotably connected to said first frame and said third frame;

(e) at least one primary wheel rotatably connected to at least one of said first frame lower portion and said first frame middle portion; and (f) at least one secondary wheel rotatably connected to said first frame upper portion;

whereby said stand is movable across said supporting surface on said primary and secondary wheels when said stand is in a collapsed position and said upper and middle portion of said first frame, said second frame, and said third frame are generally parallel to said supporting surface.

8. The stand of claim 7, wherein said stand is capable of assuming said collapsed position with said upper and middle portion of said first frame, said second frame, and said third frame generally parallel, and an operating position in which said second frame is generally perpendicular to said upper and middle portions of said first frame and said third frame is generally parallel to a surface supporting said stand.

9. The stand of claim 7, wherein said telescoping strut is capable of at least partially urging said third frame between said collapsed position and an operating position.

10. The stand of claim 7, wherein said third frame supports a tool such that said tool weight is substantially directed toward an end opposite of said rotatable connection of said third frame to said first frame upper portion.

11. The stand of claim 7, wherein said telescoping strut comprises a fluid cylinder.

* * * * *